United States Patent [19]

Solyntjes

[11] Patent Number: 4,813,780

[45] Date of Patent: Mar. 21, 1989

[54] IMAGE MASK FOR MICROFILM ROLL HANDLER

[75] Inventor: Alan J. Solyntjes, Richfield, Minn.

[73] Assignee: Minnesota Mining and Manufacturing Company, St. Paul, Minn.

[21] Appl. No.: 42,359

[22] Filed: Apr. 24, 1987

[51] Int. Cl.$^4$ .............................................. G03B 21/14
[52] U.S. Cl. ........................................ 353/88; 353/97; 353/26 R; 353/23
[58] Field of Search ....................... 353/88, 95, 96, 97, 353/DIG. 5, 26 R, 26 A, 23, 24

[56] References Cited

U.S. PATENT DOCUMENTS

| | | | |
|---|---|---|---|
| 2,147,260 | 2/1939 | Lewis | 353/88 X |
| 2,159,616 | 5/1939 | Kleerup | 353/24 |
| 3,269,261 | 8/1966 | Porter . | |
| 3,342,101 | 9/1967 | Zollner . | |
| 3,412,480 | 11/1968 | Connell | 353/27 R X |
| 3,531,193 | 9/1970 | Diehl . | |
| 3,661,449 | 5/1972 | Wright . | |

Primary Examiner—Harry N. Haroian
Attorney, Agent, or Firm—Donald M. Sell; Walter N. Kirn; David W. Anderson

[57] ABSTRACT

An image mask assembly for a microfilm roll handler includes an insert having an opaque area which can be slid relative to a frame of microfilm to block light through a portion of the film and thereby mask selected portions of an image projected by the film.

3 Claims, 2 Drawing Sheets

IMAGE MASK FOR MICROFILM ROLL HANDLER

BACKGROUND OF THE INVENTION

1. Field of the Invention

This invention relates to microfilm projectors and, in particular, those projectors adapted for use with microfilm wound on a reel.

2. Description of the Prior Art

Microfiche readers and reader/printers (hereinafter referred to only as readers) have been known and used in the microfilm arts for years. The material projected was always an image from a frame on the microfiche representing one document. Conventional microfiche readers are disclosed in such patents as U.S. Pat. No. 3,616,737 and U.S. Pat. No. 4,025,177.

A subspecies of microfiche readers includes an adapter to accommodate microfilm in reel form and transport the film to a viewing area which includes a glass plate located at the focal plane of the optics of the microfilm reader.

The purpose of the present invention is to allow the user of such a microfilm reader to mask unwanted information from a document by placing a mask in the area of the microfilm to permit selective projection and display or printing of only a portion of the information found on the frame of microfilm.

The present invention allows the user to select information to be viewed or printed and to obscure irrelevant or confidential information from a document. As an example, a credit record from client A may be read and/or printed while credit records of client B on the same frame of microfilm may be omitted.

Related to microfilm projectors are overhead projectors which project images from a transparency containing information in a non-reduced form. Overhead projectors such as those shown in U.S. Pat Nos. 3,269,261; 3,531,193 and 3,661,449 describe plates which are slideable with respect to a transparency to prevent readers from reading ahead of the material presently being discussed. U.S. Pat. No. 3,342,101 describes an overhead projector which includes a movable ruler which may be positioned to obscure a portion of a transparency. Although all of these devices associated with overhead projectors may be considered to be information masks, their teachings are not directly transferable to the microfilm arts wherein the information contained on the transparent film is greatly reduced in size.

SUMMARY OF THE INVENTION

The present invention is an image mask assembly for a microfilm roll handler which includes reels accepting microfilm wound upon and extending between the reels and under a first stationary glass, the lower surface of which defines a focal plane for the microfilm roll handler. The image mask assembly allows a user of the microfilm roll handler to selectively obscure a portion of the microfilm and particularly includes a frame supported below and biased toward the first stationary glass, a second stationary glass mounted on and biased by the frame toward the first stationary glass to capture the film between the first and second stationary glasses and an insert slideably mounted by the frame and movable with respect to the frame and the second stationary glass, which insert includes a grasping portion extending beyond the frame and an opaque area which may be positioned relative to the frame and the first and second stationary glasses for blocking light through a portion of the film and thereby masking selected portions of an image projected by the film when positioned by movement of the insert.

The insert may simply be a sheet of glass having a painted portion defining the opaque area, but is preferably made of metal and includes a bar defining the grasping portion, two end members joined one at each end of the bar and extending in one direction from the bar and beneath the second stationary glass, the end members having terminal portions, and a thin ribbon of opaque material secured to the terminal portions and extending generally parallel to the bar for providing the masking function described above. The frame preferably includes spaced rails mounting the second stationary glass and the masking insert is preferably slideably disposed between the second stationary glass and the spaced frame rails.

BRIEF DESCRIPTION OF THE DRAWINGS

The invention will be more particularly described with reference to the drawings, wherein like numbers refer to like parts in the several views, and wherein.

DESCRIPTION OF THE PREFERRED EMBODIMENT

Figure 1:
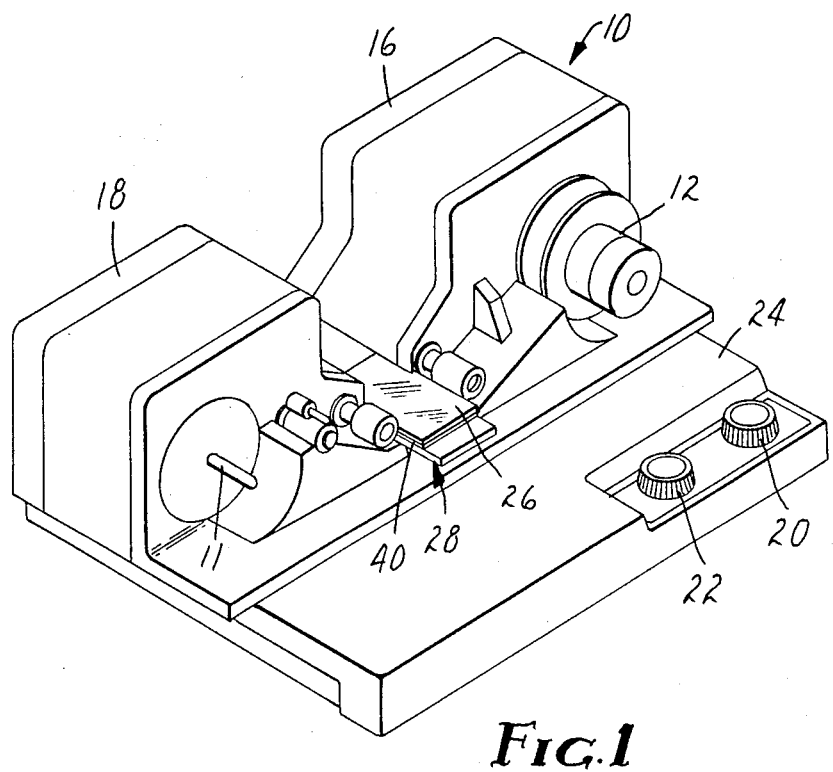
FIG. 1 is a perspective view of a microfilm roll handler which incorporates the present invention.
Figure 2:
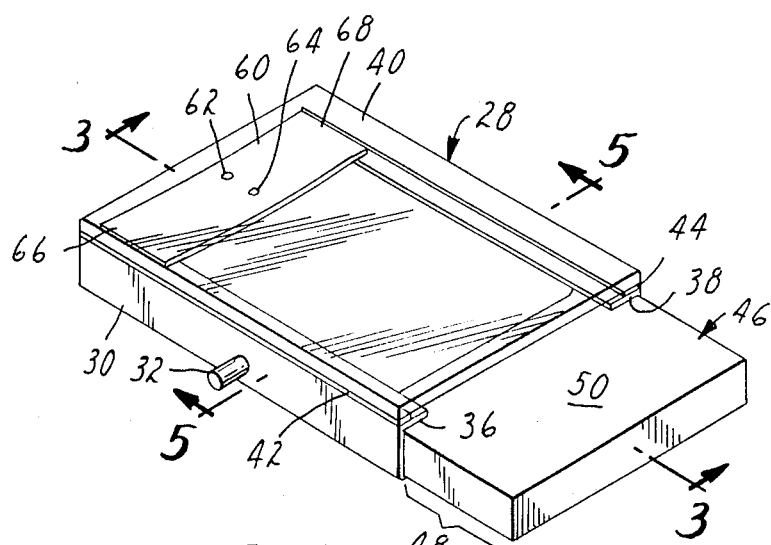
FIG. 2 is a perspective view of an image mask assembly of the present invention.

The present invention relates to a microfilm roll handler, generally indicated as 10, adapted for use with a microfilm reader of the type illustrated in U.S. Pat. Nos. 3,616,737 and 4,025,177. The roll handler 10 includes two spindles 12 and 14 which accommodate reels of microfilm (not shown) and allow the microfilm to be transported between the spindles 12 and 14 by means of motors within housings 16 and 18, respectively. Transport speed is controlled by the user by means of control knobs 20 and 22 located on a forward panel 24 of the microfilm roll handler 10.

Microfilm extending between the spindles 12 and 14 is threaded beneath a first stationary glass 26, the lower surface of which defines the focal plane for the microfilm projector into which the microfilm roll handler 10 is inserted.

Supported beneath and biased upwardly toward the first stationary glass 26 by means of a support arm (not shown) attached to the roll handler 10 is an image mask assembly 28 which is the subject matter of the present invention. The image mask assembly 28 includes a frame 30 which connects to the support arm of the microfilm projector by means of pins 32 and 34 which project from opposite sides of the frame 30. The frame has channel-shaped sides which define upper rails 36 and 38 to which is mounted a second stationary glass 40 by means of thin strips of foam tape 42 and 44 which are coated on each side with a pressure-sensitive adhesive (not shown).

Slideably mounted within the channels comprising the frame 30 is an insert 46 which includes a grasping portion 48 normally extending beyond the ends of the frame 30 and defined by a bar 50 extending across the width of the frame 30. Attached to the bar 50 defining the grasping portion 48 are two end members 52 and 54 joined one at each end of the bar 50 and extending in one direction from the bar 50 to terminal portions 56 located within the frame 30. Connecting the terminal portions 56 of the end members 52 and 54 is a transverse bar 58 to which is connected a thin ribbon of opaque material 60. The thin ribbon of opaque material 60 is preferably spot welded at 62 and 64 to the transverse bar 58 and has ends 66 and 68 which are flexed upwardly and inserted between the upper rails 36 and 38 of the frame 30 and the second stationary glass 40.

Figure 3:
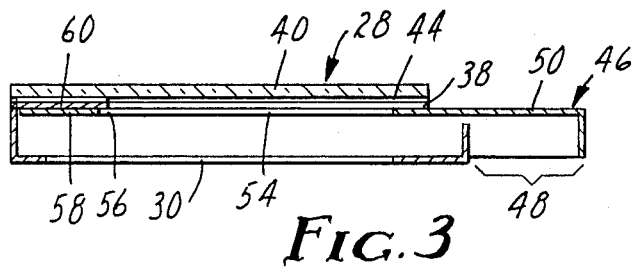
FIG. 3 is a cross-sectional elevational view of the image mask assembly of FIG. 2 taken generally along the line 3—3 of FIG. 2 with the image mask assembly in one position.
Figure 4:
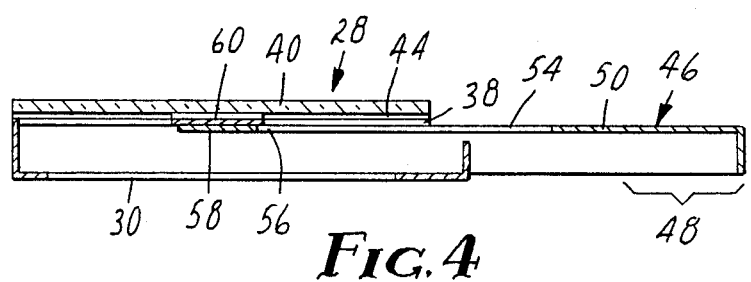
FIG. 4 is a cross-sectional view taken from the perspective of FIG. 3 with the image mask assembly in a second position.
Figure 5:
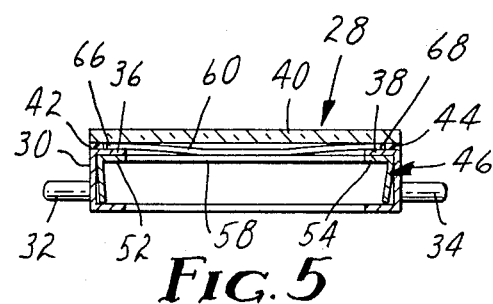
FIG. 5 is a cross-sectional elevational view taken generally along the line 5—5 of FIG. 2.

The ribbon of opaque material 60 constitutes an image mask which may be moved relative to the frame 30 and the second stationary glass 40 by withdrawing the insert 46 from the frame 30, as will be seen by comparing FIGS. 3 and 4.

The purpose of the mask 60 is to prevent the transmission of light beyond the second stationary glass 40 and thereby mask selected portions of an image projected by film captured between the first stationary glass 26 and the second stationary glass 40. It will be noted from FIG. 4 in particular that the transverse bar 58 could also block light transmitted through the second stationary glass 40, but it is desirable that the mask 60 be placed as closely as possible to the second stationary glass 40 and the film supported thereon to provide a sharp line of demarcation between those portions of the film which are blocked and those which are not. By movement of the mask 60 relative to the frame 30 and the second stationary glass 40, the operator may mask selected portions of the microfilm and thereby allow the viewing or printing of one portion of a document contained on the microfilm and prevent the viewing or printing of another.

The frame 30 and the insert 50 may be of any material, but are preferably either plastic or metal. Metal is particularly desirable for its durability. The mask 60 may be of any opaque material but is preferably the same material as the insert 46 so that the mask 60 may be welded to the insert 46. It should be recognized, however, that other methods, such as riveting, could be employed to connect the mask 60 to the transverse bar 58 of the insert 46.

Although the present invention has been described with respect to only a single embodiment, it is recognized that many modifications will be apparent to those skilled in the art. For example, the insert 46 and mask 60 could be replaced by a sheet of transparent plastic or glass inserted between the upper rails 36 and 38 of the frame 30 and the second stationary glass 40. Such a sheet of transparent plastic or glass would have to include an opaque portion, as by painting or dyeing, to produce the light blockage provided by the mask 60. All such modifications falling within the spirit and scope of the intended claims are intended to be included as part of the invention.

I claim:

1. An image mask assembly for a microfilm roll handler having reels accepting microfilm wound upon and extending between said reels and under a first stationary glass, the lower surface of which defines a focal plane for the microfilm roll handler, the image mask assembly comprising:

a frame supported below and biased toward said first stationary glass;

a second stationary glass mounted on and biased by said frame toward said first stationary glass to capture said film between said first and said second stationary glasses; and an insert slideably mounted by said frame and movable with respect to said frame and said second stationary glass, said insert including a bar defining a grasping portion extending beyond said frame, two end members joined one at each end of said bar and extending in one direction from said bar and beneath said second stationary glass, said end members having terminal portions, and a thin ribbon of opaque material secured to said terminal portions and extending generally parallel to said bar defining an opaque area which may be positioned relative to said frame and said first and said second stationary glasses for blocking light through a portion of said film and thereby masking selected portions of an image projected by said film when positioned by movement of said bar.

2. An image mask assembly for a microfilm roll handler, according to claim 1 wherein said frame includes spaced rails mounting said second stationary glass and wherein said insert is slideably disposed between said second stationary glass and said frame rails.

3. An image mask assembly for a microfilm roll handler according to claim 1 wherein said insert is metal.

* * * * *